(12) United States Patent
Steltz et al.

(10) Patent No.: US 8,548,626 B2
(45) Date of Patent: Oct. 1, 2013

(54) METHOD AND DEVICE FOR MANIPULATING AN OBJECT

(75) Inventors: Erik Edward Steltz, Melrose, MA (US); Annan Michael Mozeika, Groton, MA (US); Christopher Vernon Jones, Woburn, MA (US); Nicholas Roy Corson, Hollis, NH (US)

(73) Assignee: iRobot Corporation, Bedford, MA (US)

( * ) Notice: Subject to any disclaimer, the term of this patent is extended or adjusted under 35 U.S.C. 154(b) by 69 days.

(21) Appl. No.: 13/204,299

(22) Filed: Aug. 5, 2011

(65) Prior Publication Data
US 2012/0038180 A1 Feb. 16, 2012

Related U.S. Application Data

(63) Continuation-in-part of application No. 12/553,971, filed on Sep. 3, 2009.

(60) Provisional application No. 61/371,344, filed on Aug. 6, 2010.

(51) Int. Cl.
*B66C 1/42* (2006.01)
*B66C 1/02* (2006.01)
*B66F 19/00* (2006.01)

(52) U.S. Cl.
USPC ............ 700/245; 901/40; 294/86.4; 294/192; 294/213

(58) Field of Classification Search
USPC ..................... 700/245; 294/86.4, 119.3, 192, 294/208, 213, 902; 901/30, 40, 45, 50
See application file for complete search history.

(56) References Cited

U.S. PATENT DOCUMENTS

| 4,493,877 | A | | 1/1985 | Burnett | |
|---|---|---|---|---|---|
| 5,871,814 | A | * | 2/1999 | Livshits | 427/294 |
| 6,226,820 | B1 | | 5/2001 | Navarro | |
| 6,267,364 | B1 | | 7/2001 | Zhang | |
| 6,308,353 | B1 | | 10/2001 | Van Steenburg | |
| 6,846,029 | B1 | * | 1/2005 | Ragner et al. | 294/86.4 |
| 6,994,387 | B1 | * | 2/2006 | Ragner et al. | 294/86.4 |
| 7,184,858 | B2 | * | 2/2007 | Okazaki et al. | 700/254 |
| 7,857,369 | B2 | * | 12/2010 | Chiel et al. | 294/86.4 |
| 2006/0033350 | A1 | * | 2/2006 | Besch | 294/119.3 |
| 2010/0054903 | A1 | * | 3/2010 | Jones et al. | 414/800 |
| 2010/0217436 | A1 | * | 8/2010 | Jones et al. | 700/245 |
| 2011/0089708 | A1 | * | 4/2011 | Mankame et al. | 294/86.4 |
| 2011/0211938 | A1 | * | 9/2011 | Eakins et al. | 414/738 |
| 2011/0218676 | A1 | * | 9/2011 | Okazaki | 700/260 |

FOREIGN PATENT DOCUMENTS
WO WO2006082100 A1 8/2006

* cited by examiner

*Primary Examiner* — Paul N Dickson
*Assistant Examiner* — Barry Gooden, Jr.
(74) *Attorney, Agent, or Firm* — Honigman Miller Schwartz and Cohn LLP

(57) ABSTRACT

A method and device for manipulating an object is provided. In an exemplary embodiment, a gripping device configured to grasp the object includes a housing, a jamming material inside the housing, a first actuator to actuate the jamming material, a first pressure activation device disposed on a first outer portion of the housing and configured to exert a constricting force on the first outer portion of the housing, and a second actuator to actuate the first pressure activation device. After the end effector is pressed against the object, the second actuator actuates the first pressure activation device to exert an inward force on the first outer portion of the housing and the first actuator actuates the jamming material to grasp the object.

8 Claims, 10 Drawing Sheets

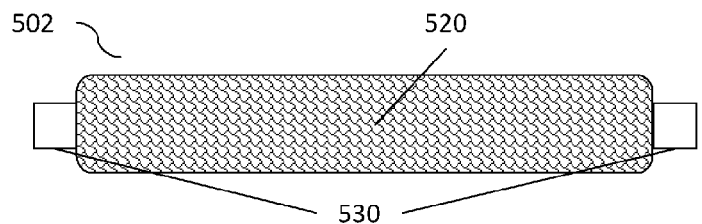
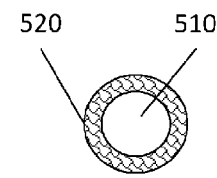
FIG. 5A   FIG. 5D
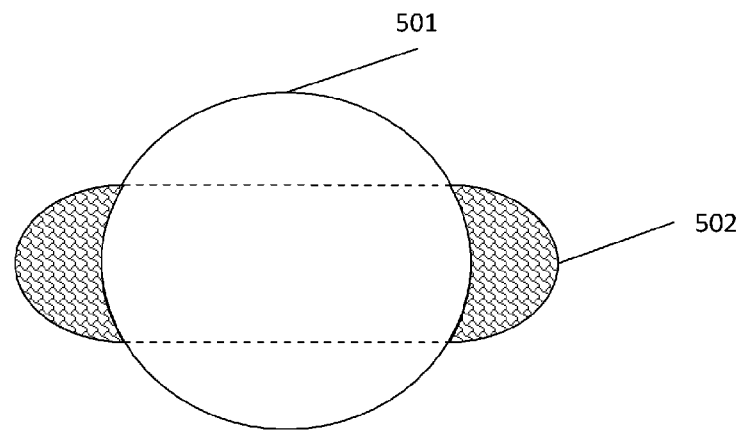
FIG. 5B
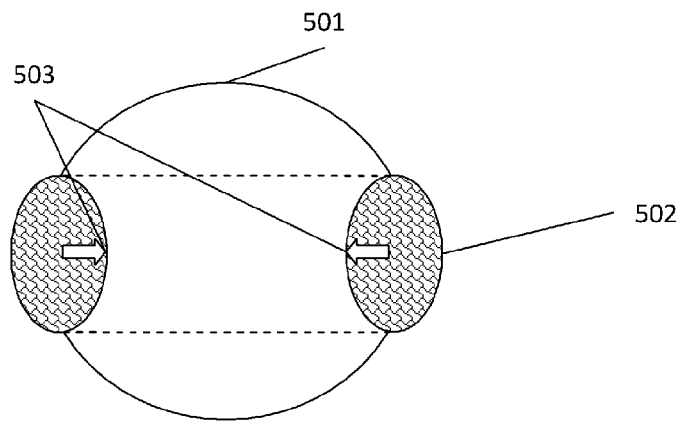
FIG. 5C

US 8,548,626 B2

METHOD AND DEVICE FOR MANIPULATING AN OBJECT

INTRODUCTION

The present teachings are a continuation-in-part of U.S. Non-Provisional patent application Ser. No. 12/553,971, filed Sep. 3, 2009, the entire content of which is incorporated herein by reference. This application also claims priority to U.S. Provisional Patent Application No. 61/371,344, filed Aug. 6, 2010, titled Method and Device for Manipulating an Object, the disclosure of which is incorporated herein by reference.

The present teachings relate to a gripping device, for example for use as a robotic end effector, including a pressure activation device on an outer portion of a housing and configured to exert a constricting force on the outer portion of the housing.

BACKGROUND

Application Ser. No. 12/553,971, filed Sep. 3, 2009 (hereinafter "the '971 application"), discloses a method and device for manipulating an object with a remote vehicle having an end effector attached to a manipulator arm. The end effector comprises a jamming material in a housing. The jamming material in the '971 patent is also referred to as a phase-change material, and "jamming," as used herein, includes such phase change materials. The method comprises pressing the end effector housing to the object, activating the jamming material to grasp the object, and moving the manipulator arm to manipulate the object.

In accordance with various embodiments, the end effector includes a substantially air-impermeable housing that is filled with a jamming material. The composition of the housing can vary depending on the desired manipulation traits, the material contained in the housing, the size of the housing, and economic considerations. The material comprising the housing(s) should be at least minimally elastic or flexible and can have some degree of friction on its surface to aid in object manipulation. The housing(s) should also have a strength (e.g., tear resistance) that is sufficient for objects it is intended to manipulate. For example, a more tear resistant material is desirable when objects to be manipulated may have sharp edges or points, whereas tear resistance can be less critical when objects to be manipulated are smooth.

The housing may include, for example, a balloon such as a latex balloon, a platinum-cure or tin-cure silicone-based rubber, a plastic bag such as a zip lock bag, or a Kevlar composite. Kevlar can provide strength against puncturing and can be combined with a more elastic material to attain a desired flexibility for the housing. Platinum-cure or tin-cure RTV (room temperature vulcanizing) silicone-based rubbers can be desirable because they are easily molded into custom shapes. The housing can surround the jamming material and an activation device can be in communication with the jamming material. The activation device can be located inside or outside of a housing.

When end effector housings such as those disclosed in the '971 application are pressed against an object, the housings may be unable to surround the object to the extent necessary to securely grasp the object. Thus, existing housings may not be able to properly grasp an object to sustain or generate the pressure required to grasp the object for manipulation.

SUMMARY

Exemplary embodiments of the present teachings relate to a gripping device, such as for use as an end effector configured for attachment to a manipulator arm to manipulate an object.

The present teachings provide a gripping device configured to grasp an object, the gripping device comprising a housing, a jamming material inside the housing, a first actuator to actuate the jamming material, a first pressure activation device disposed on a first outer portion of the housing and configured to exert a constricting force on the first outer portion of the housing, and a second actuator to actuate the first pressure activation device. After the gripping device is pressed against the object, the second actuator actuates the first pressure activation device to exert an inward force on the first outer portion of the housing and the first actuator actuates the jamming material to grasp the object.

The present teachings also provide an end effector configured to grasp an object, the end effector comprising a housing, a jamming material inside the housing, a first actuator to actuate the jamming material, a first pressure activation device disposed on a first outer portion of the housing and configured to exert a constricting force on the first outer portion of the housing, and a second actuator to actuate the first pressure activation device. After the end effector is pressed against the object, the second actuator actuates the first pressure activation device to exert an inward force on the first outer portion of the housing and the first actuator actuates the jamming material to grasp the object.

The present teachings further provide a method for using a gripping device to grasp an object, the gripping device comprising a housing containing a jamming material and at least one pressure activation device, the method comprising directing the gripping device toward the object, pressing the gripping device onto the object, activating the at least one pressure activation device, and activating the jamming material in the housing.

BRIEF DESCRIPTION OF THE DRAWINGS

FIGS. 5A-5D include schematic diagrams of an exemplary embodiment of a gripping device of the present teachings, wherein a pressure application device comprises a McKibben actuator.

DESCRIPTION OF EXEMPLARY EMBODIMENTS

Reference will now be made in detail to the present teachings, exemplary embodiments of which are illustrated in the accompanying drawings FIGS. 1A-1E include a schematic diagram of a first exemplary embodiment of a gripper device in accordance with the present teachings that can be used as an end effector for a remote vehicle manipulator arm, wherein the gripper device includes a one-piece housing 100 and a pressure application device 101 for applying pressure to a portion of the housing. The end effector may be located, for example, at a distal end of the remote vehicle manipulator arm, and may pick up an object O as shown in FIGS. 1A-1E. The remote vehicle, pneumatics, motors, and electronics are omitted for simplicity.

Figure 1A:
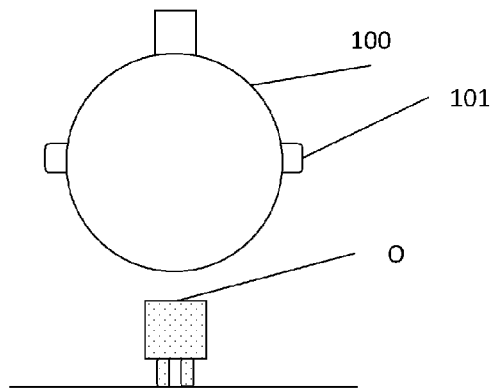
FIGS. 1A-1E include schematic diagrams of an exemplary embodiment of the present teachings, wherein a gripping device, shown as an end effector including a housing and pressure application device picks up a target object.
Figure 1B:
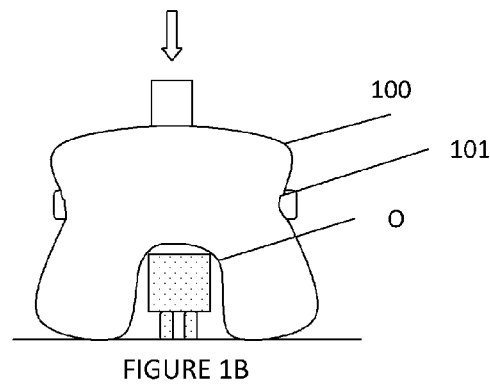

In FIG. 1A, the housing 100 is driven toward the object O to make contact with the object. In FIG. 1B, the housing 100 has made contact with the object O and is pressed to the object O. The housing 100 deforms around the object O because it is not activated. The pressure application device is preferably not activated while the housing 100 is initially pressed to deform around the object O in FIG. 1B. The pressure activation device 101 and the material within the housing 100 are activated after the housing 100 has been pressed to the object O, and then the object O can be manipulated. FIGS. 1A-1E are discussed in further detail below.

The pressure application device 101 may include, but is not limited to, a biased belt that can be combined with an inflatable toroidal housing, a jamming belt that can be combined with an inflatable toroidal housing, a jamming region that can be combined with spherical housings, and a McKibben belt. Different types of belts can be combined with different types of housings as desired for a given application. Each of the above embodiments of the pressure application device is described in more detail below with respect to FIGS. 2A, 2B, 3A, 3B, 4A-4D, and 5A-5D.

Figure 1C:
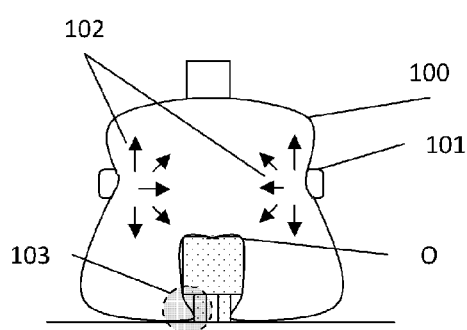
Figure 1D:
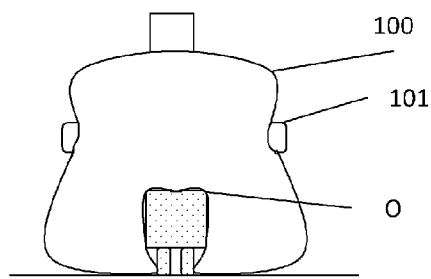
Figure 1E:
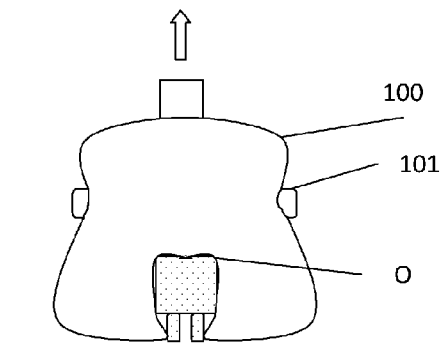
Figure 1F:
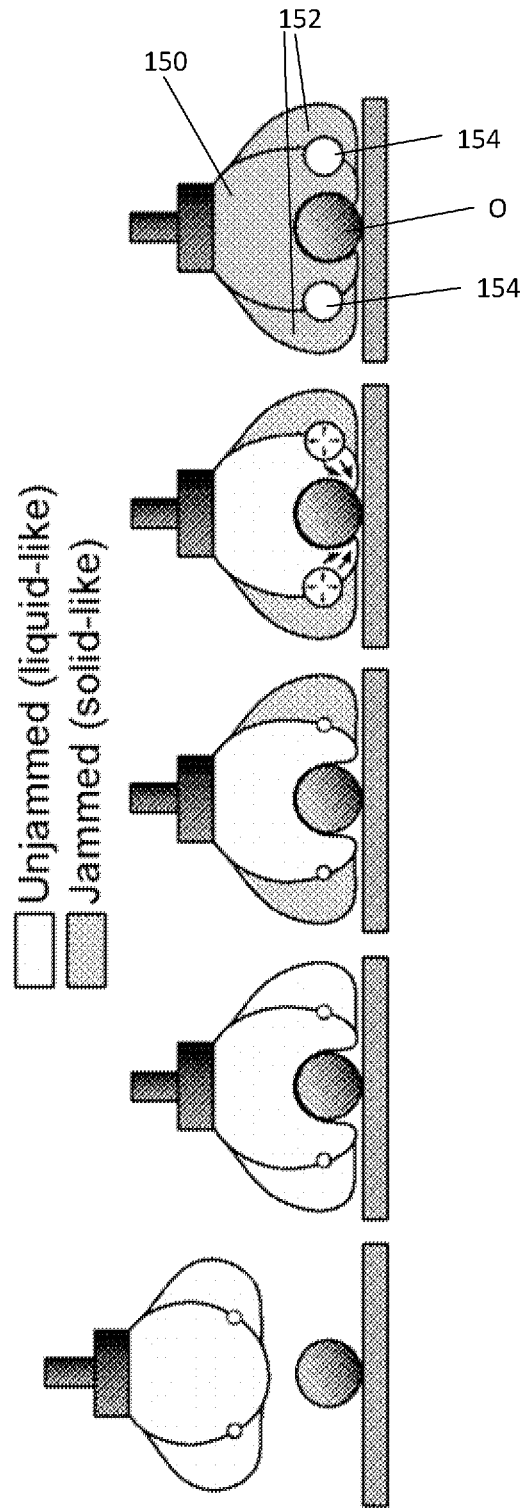
FIG. 1F includes a schematic diagram of another exemplary embodiment of the present teachings, wherein a gripping device, shown as an end effector including more than one housing and a pressure application device, picks up a target object.

FIG. 1F includes a schematic diagram of another exemplary embodiment of the present teachings, wherein a gripping device, shown as an end effector including more than one housing and a pressure application device, picks up a target object. The gripping device embodiment of FIG. 1F includes a central housing 150 containing a first phase change material, surrounded by a first pressure activation device embodied in a circumferential housing 152 containing a second phase change material and a second pressure activation device 154 located, for example, between the central housing 150 and the circumferential housing 152. The central and circumferential housings 150, 152 can be made of the same or different materials, and can be filed with the same or difference phase change materials. The second pressure activation device can comprise, for example, a number of embodiments as set forth herein.

As shown in the sequence of FIG. 1F, from left to right, the housings 150, 152 are driven toward the object O to make contact with the object. The central housing 150 makes contact with the object O and is pressed to the object. The central housing 150 deforms around the object O because the phase-change material therein is not activated. The circumferential housing 152 in this embodiment acts as a first pressure application device, and is preferably not activated while the central housing 150 is initially pressed to deform around the object O.

Thereafter, as shown, the phase-change material in the circumferential housing 152 is activated, the second pressure activation device 154 is activated to press material in the central housing 150 downward and inward around the object O, and then the phase change material in the central housing 150 is activated.

Figure 2A:
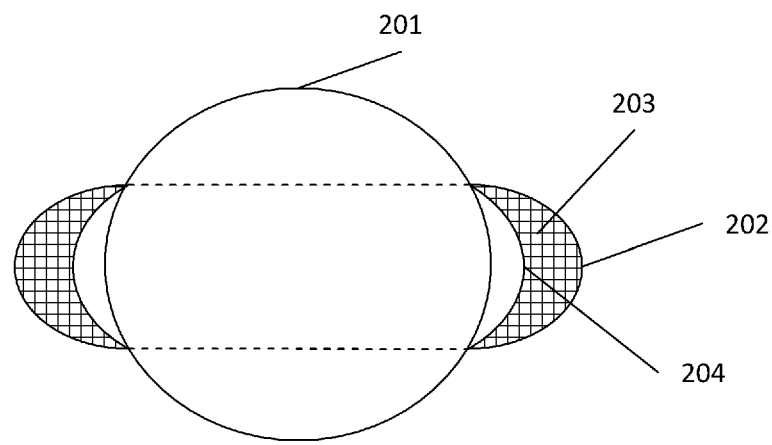
FIGS. 2A and 2B include schematic diagrams of an exemplary embodiment of a gripping device of the present teachings, wherein a pressure application device comprises a biased belt and an inflatable toroidal housing.

In accordance with certain embodiments of the present teachings, an embodiment of the pressure activation device includes a biased belt combined with (e.g., surrounding) an inflatable toroidal housing as shown in FIG. 2A. The biased belt can comprise, for example, a flexible silicone belt 202 placed around the equator of a housing 201, and a toroidal housing 204 placed between the belt 202 and the housing 201. The belt 202 can include an embedded cloth 203, for example a nylon mesh, to control outward expansion of the belt while maintaining the flexibility of the silicone.

Figure 2B:
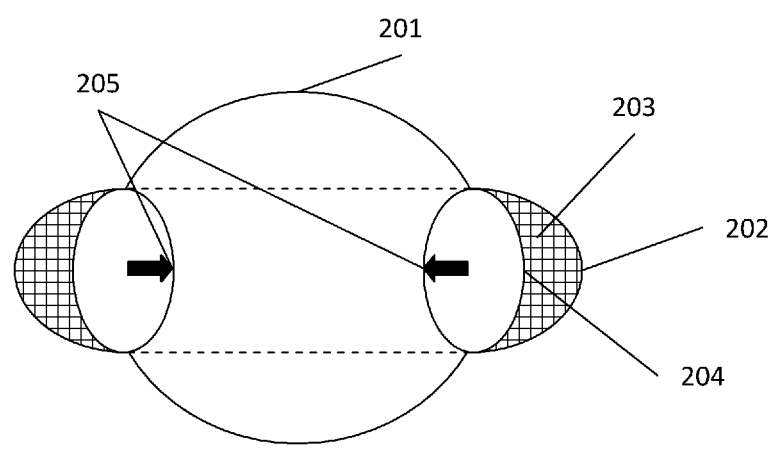

FIG. 2B shows application of pressure on the housing 201 according to the embodiment of FIG. 2A. Pressure on the housing 201 can be accomplished by activating the biased belt after the housing 201 has been pressed on an object (not shown). The biased belt can be activated by inflating the toroidal housing 204 to press the housing 201 inward, as shown by arrows 205. The flexible silicone belt 202 directs forces from the inflated toroidal housing 204 inward by controlling outward expansion of the toroidal housing 204. The material in the housing 201 can be phase change material, and that material can be jammed to grasp the object.

Figure 3A:
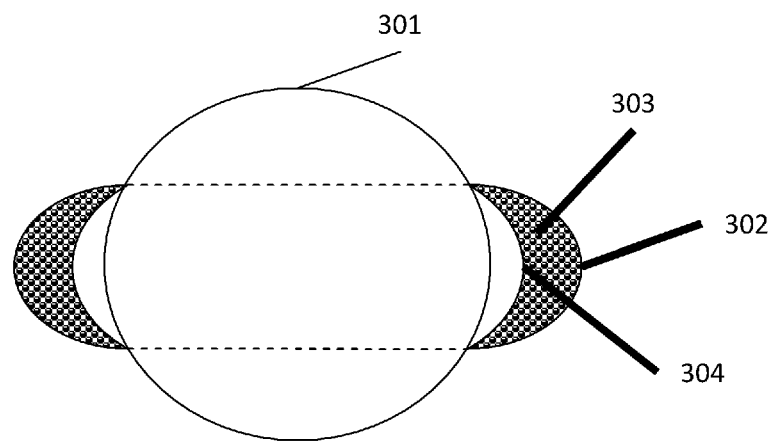
FIGS. 3A and 3B include schematic diagrams of another exemplary embodiment of a gripping device of the present teachings, wherein a pressure application device comprises a jamming belt and an inflatable toroidal housing.

In accordance with certain embodiments, a pressure activation device comprises a jamming belt combined with an inflatable toroidal housing, as shown in FIG. 3A. The pressure activation device can comprise a flexible and elastic belt 302 placed around the equator of a housing 301, and a toroidal housing 304 placed between the belt 302 and the housing 301. The flexible and elastic belt 302 and toroidal housing 304 can allow outward expansion while the housing 301 is being pressed on an object (not shown), but the toroidal housing 304 can be jammed (activated) to prevent further expansion after the housing 301 has been pressed on the object. In addition, jamming the material in the toroidal housing can additionally force material in the housing to better surround the object to be grasped. The material in the housing 301 can be phase change material, and that material can be jammed to grasp the object.

The jamming belt 302 can comprise a jamming material 303. A housing of the jamming belt 302 can comprise a flexible and expandable material such as, for example, rubber or latex. The jamming material 303 can comprise, for example, any jamming material disclosed in the '971 application. Jamming, as recited herein, such as of a housing or a belt, can comprise, for example, any method for jamming the housing disclosed in the '971 application. The type of jamming that occurs can be dictated by the jamming material being utilized. The toroidal housing 304 can comprise flexible and expandable material such as, for example, rubber or latex, and may be inflated with air, or similar substance, to a pressure of, for example, 15 psi.

Figure 3B:
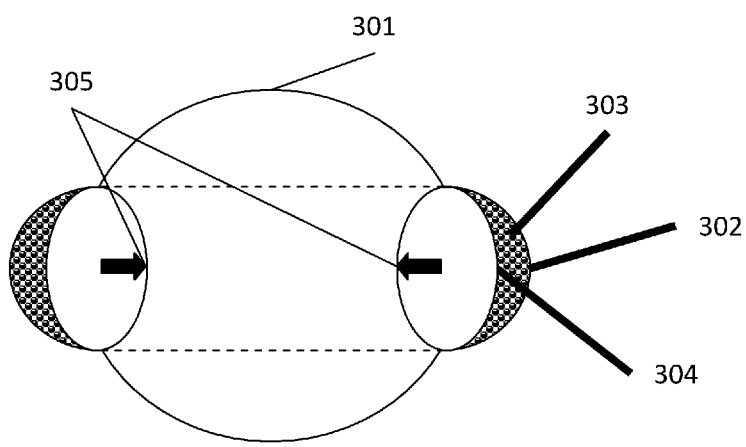

FIG. 3B shows application of pressure on the housing 301 according to the embodiment of FIG. 3A. Pressure on the housing 301 can be accomplished by activating the jamming belt 302 after the housing 301 has been pressed on an object (not shown). The jamming belt can be activated by inflating the toroidal housing 304 to press the housing 301 inward, as shown by arrows 305. The jamming belt 302, when activated, can direct forces from the inflated toroidal housing 304 inward by controlling outward expansion of the toroidal housing 304. The material in the housing 301 can be phase change material, and that material can be jammed to grasp the object.

Figure 4A:
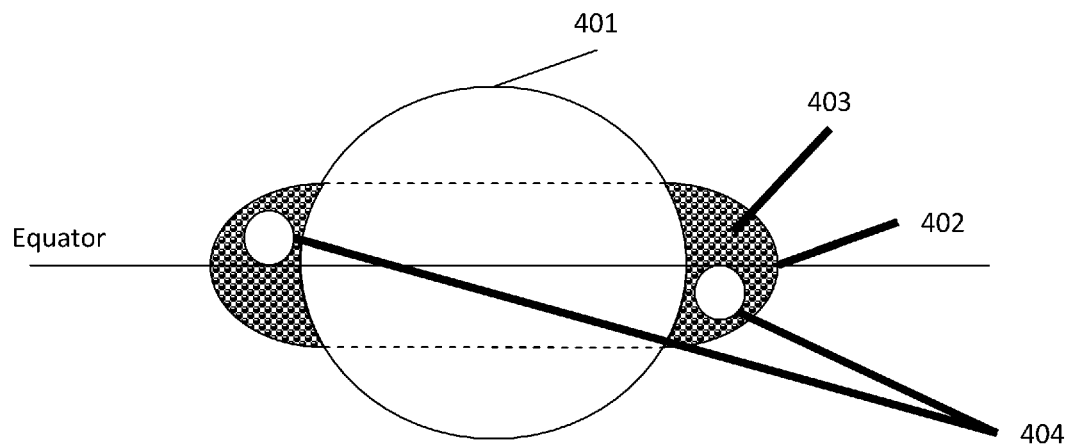
FIGS. 4A-4D include schematic diagrams of another exemplary embodiment of a gripping device of the present teachings, wherein a pressure application device comprises a jamming region combined with spherical housings.

In accordance with certain embodiments of the present teachings, a jamming region can comprise one or more expandable housings, such as spherical housings, around a central housing, as shown in FIG. 4A. In particular, spherical inflatable housings 404 may be embedded inside jamming material of a jamming region 403 of a belt 402, for example at evenly-spaced locations around the jamming region 403. The expandable housings 404 can extend above and/or below an equator of the housing 401. The jamming material of the jamming region 403 can comprise, for example, any jamming material capable of being used in the housing disclosed in the '971 application. Jamming of the belt 402 can comprise, for example and not as limitation, any method for jamming the jamming material disclosed in the '971 application. The spherical inflatable housings 404 may comprise flexible and expandable material such as, for example, rubber or latex, and may be inflated with air, or a similar substance, to a pressure of, for example, 15 psi.

Figure 4B:
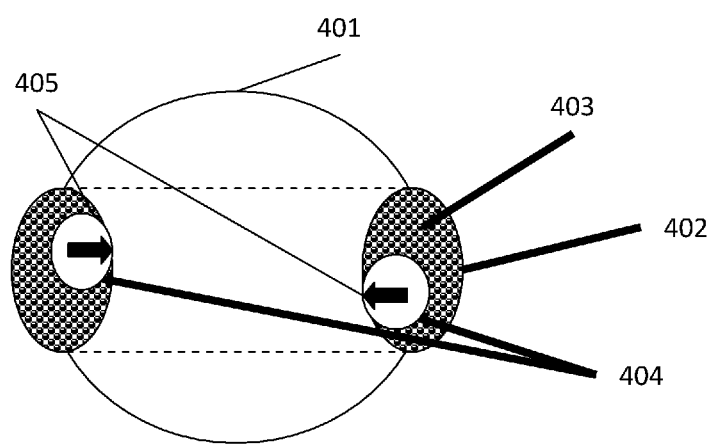

FIG. 4B shows application of pressure on the housing 401 according to the embodiment of FIG. 4A. Pressure on the housing 401 can be accomplished by activating the belt 402 after the housing 401 has been pressed on an object (not shown). The belt 402 can be activated by inflating the housings 404 to exert a pressure inward, as shown by arrows 405, and then jamming the jamming region 403 to exert additional pressure inward.

Figure 4C:
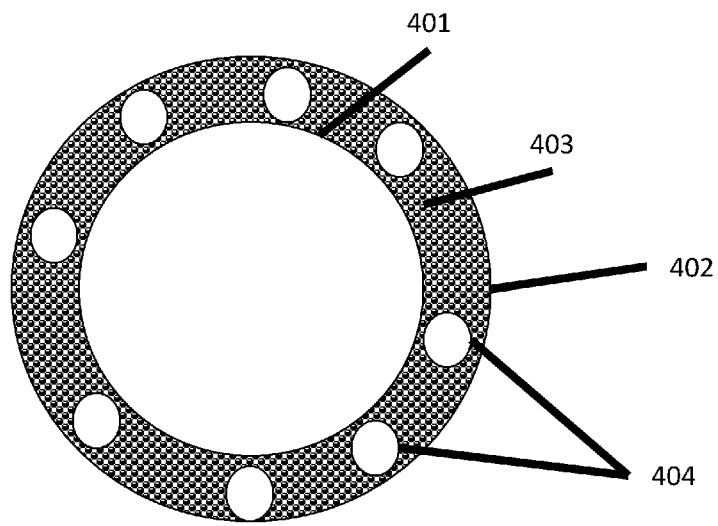
Figure 4D:
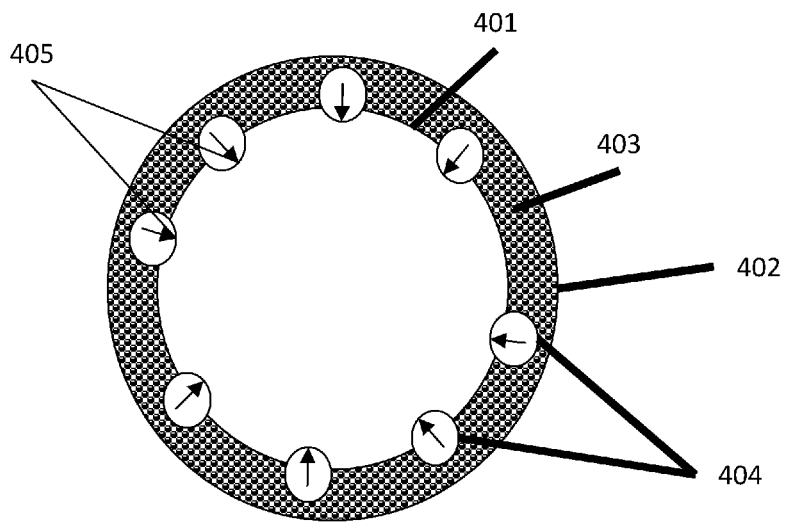

FIGS. 4C and 4D show a top view of an exemplary application of pressure by the jamming belt 402 on the housing 401. FIG. 4C shows a top view of the embodiment of FIGS. 4A and 4B, before application of pressure on the central housing 401 via inflation of the small spherical housings 404. FIG. 4D shows application of pressure on the central housing 401 by inflating the small spherical housings 404 to press the central housing 401 inward, the direction of pressure exerted by the small spherical housings being represented by arrows 405. One skilled in the art will understand that the size, shape, and manner of inflation of the housings 404 can vary in accordance with the present teachings. Indeed, one skilled in the art will understand that the size, shape, and manner of inflation of the central housing and belt can vary as well.

In accordance with certain embodiments of the present teachings, a ring-shape McKibben actuator 502 may be placed surrounding a housing 501, as shown in FIGS. 5A-5D. A side view of an exemplary McKibben actuator 502 is shown in FIG. 5A, and a cross sectional view thereof is shown in FIG. 5D, illustrating an internal bladder 510 surrounded by an external braided mesh shell 520, with flexible yet non-extensible threads. The braided mesh shell 520 is attached at either end to fittings 530. When the internal bladder 510 is pressurized, a high pressure gas (or liquid) pushes against its inner surface and against the braided mesh shell 520, tending to increase its volume. Due to the non-extensibility of the threads in the braided mesh shell 520, the braided mesh shell 520, and thus the entire actuator 502, shortens according to its volume increase and/or produces tension if it is coupled to a mechanical load. Thus, a McKibben actuator converts pneumatic (or hydraulic) energy into mechanical energy by transferring the pressure applied on the inner surface of its bladder 510 into a shortening tension.

FIG. 5B schematically illustrates a McKibben actuator 502 surrounding a central housing 501 in accordance with an embodiment of the present teachings. The McKibben actuator 502 can be activates as described above to apply pressure to the housing 501 once the housing 501 has been pressed onto an object to be grasped (not shown). Activation of the McKibben actuator 502 presses the housing 501 inward, as shown by arrows 503.

FIGS. 1A-1E illustrate an embodiment of a gripping device, illustrated as a remote vehicle end effector, in accordance with the present teachings as it grasps and manipulates an object. In FIG. 1A, the housing 100 and pressure application device 101 are pliable (e.g., for embodiments realizing jamming via volume change, the housing may be at atmospheric pressure when fully unjammed) and therefore can wrap around at least a portion of an object O to be grasped. In FIG. 1B, the housing 100 and pressure application device 101 have been moved down towards the object O and pressed over and around the object O, therefore surrounding at least a portion of the object O to be grasped. The housing 100 and pressure application device 101 have not been actuated to grasp the object O.

In FIG. 1C, the pressure application device 101 is actuated to generate pressure inward at a location close to the equator of the bag. While location of the pressure application device 101 is preferable at or around the housing equator, one skilled in the art will appreciate that the pressure application device may be located at a variety of positions with respect to the housing depending on the gripper device configuration and intended use. The pressure applied by pressure application device 101 causes displacement of the (still unjammed) jamming material inside the housing 100 in the direction of arrows 102. In certain embodiments of the present teachings, the displacement of jamming material caused by pressure application device 101 displaces jamming material towards the bottom of object O and pushes a portion of housing 100 under portions of object O, as shown in region 103 of FIG. 1C.

In FIG. 1D, the housing 100 is actuated and becomes rigid, for example by a volume change (e.g., removing fluid from the housing via a vacuum), and grips the object O by application of forces applied by the rigid housing. Housing 100 and pressure application device 101 provide forces having a magnitude and direction sufficient to lift and manipulate the object O as illustrated in FIG. 1E. An end effector to which the housing is attached, and thus the gripped object, can then be moved by the remote vehicle manipulator arm.

The gripped object may be released, for example, by allowing the material within the housing to unjam (e.g., for materials such as coffee grounds that phase change via volume change, by allowing the interior of the housing to return to atmospheric pressure) and by releasing pressure applied by pressure application device 101. In certain embodiments, pressure applied by the pressure application device 101 can be removed first, and then the housing 100 can be unjammed, or vice versa. One skilled in the art will understand that, although the pressure application device 101 is depicted as a single belt/band 101 in FIGS. 1A-1E, it can comprise a number of embodiments having different configurations (e.g., discrete housings), for example as described above with respect to FIGS. 2A-5D.

FIGS. 6A-6E illustrate another embodiment of a gripper device, depicted herein as a remote vehicle end effector, as it grasps and manipulates an object. As shown, the gripper device can comprise a housing 600, a first pressure application device 601 for applying pressure to a portion of the housing, and a second pressure application device 602 for applying pressure to another portion of the housing 600. The housing 600 can be located, for example, on a distal end of a remote vehicle manipulator arm. The remote vehicle, pneumatics, motors, and electronics are omitted for simplicity. Each of pressure application devices 601 and 602 may be similar to previously-described pressure application devices described hereinabove, and thus, their description is omitted here.

Figure 6A:
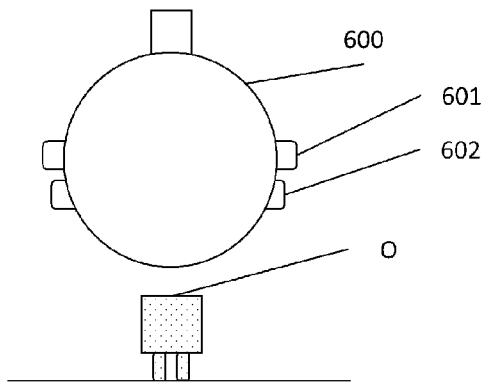
FIGS. 6A-6E include schematic diagrams of another exemplary embodiment of a gripping device of the present teachings, wherein an end effector including a housing and multiple pressure application devices picks up a target object.
Figure 6B:
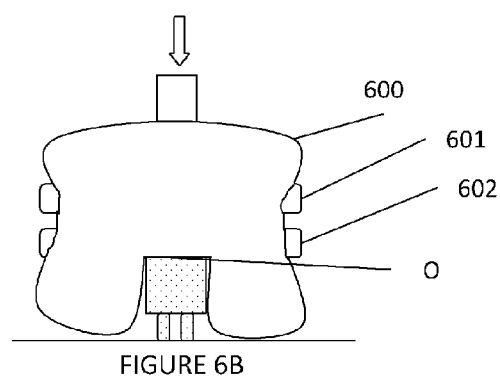

In FIG. 6A, the housing 600, the first pressure application device 601, and the second pressure application device 602 are unactuated and therefore pliable (e.g., for embodiments realizing jamming via volume change, the housing may be at atmospheric pressure when fully unjammed) and therefore can wrap around at least a portion of an object O to be grasped. In FIG. 6B, the housing 600, the first pressure application device 601, and the second pressure application device 602 have been moved down towards the object O and pressed over and around the object O, therefore surrounding a portion of the object O to be grasped. The housing 600, the first pressure application device 601, and the second pressure application device 602 have not been actuated to grasp the object.

Figure 6C:
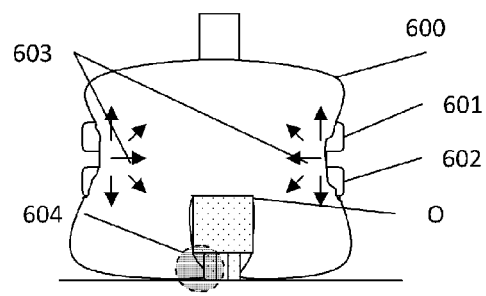

In FIG. 6C, the first pressure application device 601 and the second pressure application device 602 are actuated, simultaneously or successively, to generate pressure inward along portions of the bag. The pressure applied by devices 601 and 602 can cause displacement of the (still unjammed) jamming material inside the housing 600 in the direction of arrows 603. In certain embodiments of the present teachings, the displacement of jamming material caused by pressure application devices 601 and 602 may displace jamming material towards the bottom of object O and push a portion of housing 600 under portions of object O, as shown in region 604 of FIG. 6C.

Figure 6D:
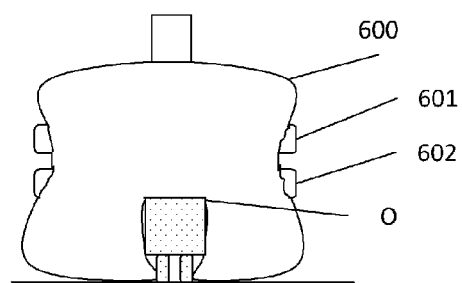
Figure 6E:
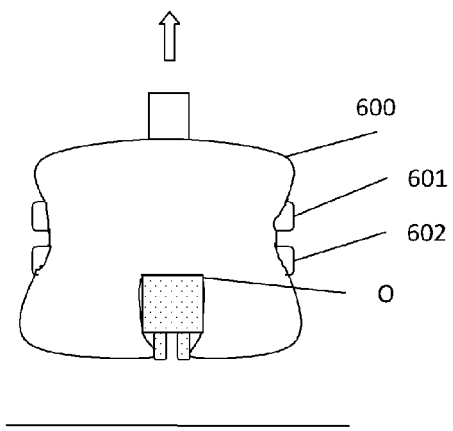

In FIG. 6D, the housing 600 is actuated and becomes rigid, for example by a volume change (e.g., removing fluid from the housing via a vacuum) and grips the object O by application of forces applied by the rigid housing. In certain embodiments, forces applied by the pressure application devices 601 and 602 can be applied sequentially, for example by activating the first pressure application device 601 before activating the second pressure activation device 602, or vice versa. An end effector to which the housing is attached, and thus the gripped object, can then be moved by the remote vehicle manipulator arm.

The gripped object may be released, for example, by allowing the material within the housing to unjam (e.g., for materials such as coffee grounds that phase change via volume change, by allowing the interior of the housing to return to atmospheric pressure) and by releasing pressure applied by pressure application devices 601 and 602. In certain embodiments, forces applied by the pressure application devices 601, 602 can be removed first, and then the housing 600 can be unjammed, or vice versa. Further, forces applied by the pressure application devices can be removed simultaneously or sequentially, for example by deactivating the second pressure application device 602 before deactivating the first pressure activation device 601, or vice versa. One skilled in the art will understand that, although the first and second pressure application devices 601, 602 are drawn as single bands in FIGS. 6A-6E, they can comprise a number of embodiments having different configurations (e.g., discrete housings) as described hereinabove. Further, the first and second pressure application devices 601, 602 need not have the same configuration or pressure application ability. They may be different sizes or different types, as would be determined based on certain design and economic considerations.

Figure 7:
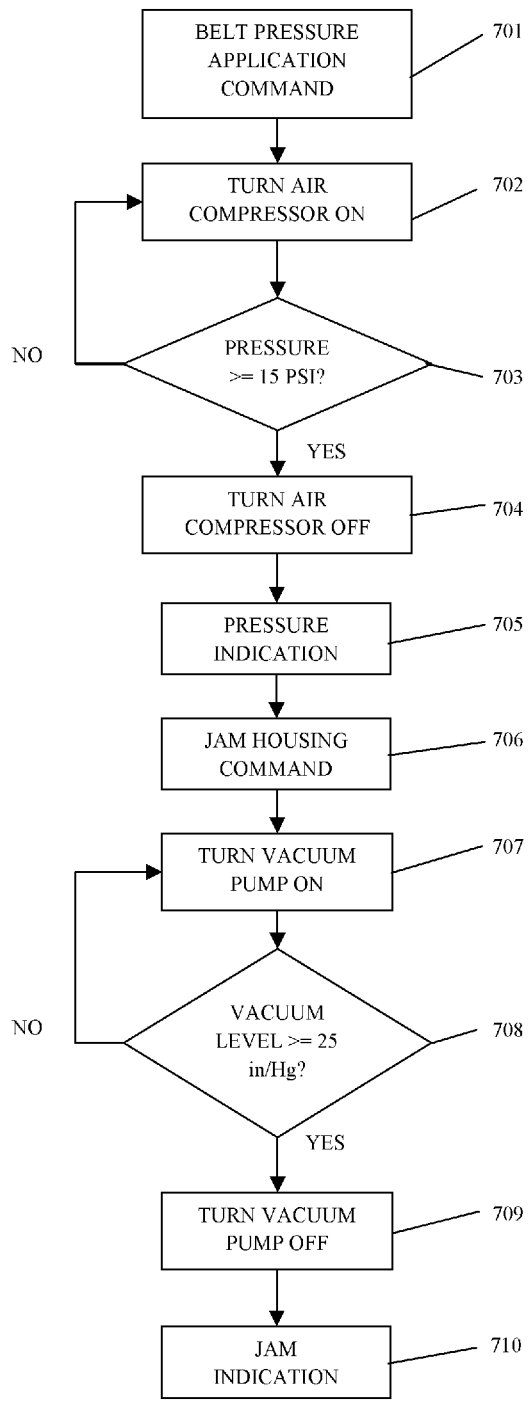
FIG. 7 is a flow chart illustrating an exemplary jamming process in accordance with an exemplary embodiment of the present teachings.
Figure 8:
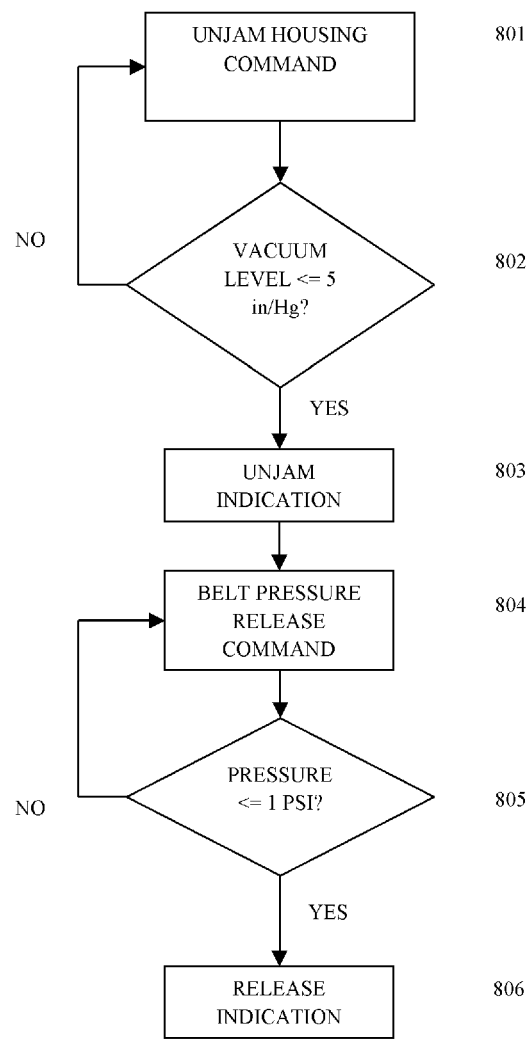
FIG. 8 is a flow chart illustrating an exemplary unjamming process in accordance with an exemplary embodiment of the present teachings.

FIGS. 7 and 8 are flow charts illustrating an exemplary jamming process and an exemplary unjamming process, respectively, in accordance with the present teachings. One skilled in the art will understand that other jamming and unjamming processes can be employed in accordance with the present teachings. The one or more pressure application devices to be used in this exemplary method can include, but are not limited to, one of the pressure application devices discussed hereinabove. These exemplary pressure application devices have been explained in detail with respect to FIGS. 2A-5D, and thus, their description is omitted here. For simplicity, the exemplary embodiment will be explained as including a biased belt combined with an inflatable toroidal housing.

In various embodiments of the present teachings, the jamming or other phase change material within the housing may include coffee grounds or another material that exhibits a solid-like behavior upon evacuation of air or another fluid with which it is combined. Jamming can be initiated with a command received, for example, by the remote vehicle controller from, for example, an operator control unit. Transmission, receipt, and implementation of the command can be accomplished in a manner similar to transmission, receipt, and implementation of other remote vehicle teleoperation commands.

With respect to FIG. 7, upon receipt of a belt application command (701), an air compressor is activated (702) to inflate the toroidal housing, causing pressure on the housing to displace some of the jamming material (see FIGS. 1C and 6C and associated disclosure for details with respect to the displacing of the jamming material). The air compressor remains activated until the pressure in the toroidal housing reaches a predetermined level (703; predetermined level can be, for example, >=15 psi). When the pressure sensor indicates that the pressure in the toroidal housing is greater than or equal to the predetermined level, the air compressor can be turned off (704). The toroidal housing pressure is maintained, for example, by closing a valve connecting the air compressor to the toroidal housing. In certain embodiments of the present teachings, reaching the predetermined level of pressure in the toroidal housing can be "confirmed" to the operator by sending a suitable indication to the operator (705). Confirmation can be sent to the operator via, for example, a signal to the operator control unit that is communicated visually, haptically, via audio, or any combination thereof.

Upon receipt of the pressure confirmation command, the operator or an automated feature of the control system may transmit a "jam housing" command (706). Jamming of the housing can be performed, for example, by activating a vacuum pump (707) while the vacuum level in the housing is less than a predetermined level (708; predetermined level can be, for example, >=25 in·Hg). This is because, if the vacuum level in the housing is greater than or equal to 25 in·Hg, the housing already has the desired level of vacuum for this embodiment.

Pressure in the housing can be measured, for example, by a second pressure sensor within or otherwise connected to the housing. When the second pressure sensor indicates that the pressure in the housing is greater than or equal to the predetermined level (at 708) the vacuum pump can be turned off (709). Pressure in the housing can be maintained, for example, by closing a valve connecting the vacuum pump with the housing to retain the desired pressure in the housing. In certain embodiments of the present teachings, jamming in the housing can be "confirmed" to the user when a desired pressure in the housing (e.g., 25 in·Hg) is reached by sending a suitable indication to the user (710). Confirmation can be sent to the operator via, for example, a signal to the operator control unit that is communicated visually, haptically, via audio, or any combination thereof.

While the command to activate jamming of the housing is preferably sent after inflation of the toroidal housing is confirmed, the command to activate jamming of the housing may alternatively be sent at the same time that the belt pressure application command is sent, or at a predetermined time thereafter. If more than one pressure activation device is provided, the commands to activate the pressure activation devices can be sent at the same time or can be staggered. Commands can be staggered to be transmitted within a predetermined period of time or a second pressure activation device can be actuated after activation of the first pressure activation device is complete (i.e., when a desired pressure has been attained).

Although the exemplary embodiment depicted in FIG. 7 discloses grasping an object (after pressing the end effector to the object) by activating the pressure application device(s) before activating the housing, the present teachings are not so limited. For example, the at least one pressure application device may be activated after activating the housing, or both the at least one pressure application device and the housing may be activated simultaneously.

With respect to FIG. 8, unjamming is initiated when an "unjam housing" command (801) is received by the remote vehicle controller from, for example, an operator control unit. Transmission, receipt, and implementation of the unjam command can be accomplished in a manner similar to transmission, receipt, and implementation of other remote vehicle teleoperation commands. In the exemplary embodiment of FIG. 8, the vacuum pump or a valve can be used to cause unjamming in the housing (not shown).

Upon receipt of the unjam command, unjamming is performed by, for example, opening a valve connecting the housing with a low pressure vent to allow an exchange of air or other fluid with the housing, thereby causing the housing to return to an unjammed state (for example atmospheric pressure when coffee grounds are used as a jamming or other phase change material). A low pressure vent can provide controlled access to the external environment or another non-vacuum environment. In certain embodiments (not illustrated in the flowcharts of FIGS. 7 and 8), the vacuum pump can be run in reverse to pull fluid from the housing (with the low pressure vent closed or opened, but preferably closed), allowing the housing to become pliable more quickly.

In the exemplary embodiment of FIG. 8, when the vacuum level in the housing is, for example, less than or equal to 5 in·Hg, unjamming of the housing can be confirmed (803). The valve leading to the low pressure vent need not, however, be closed upon confirmation of unjamming. Unjamming in the housing may be "confirmed" when a desired pressure in the housing (e.g., 5 in·Hg) is indicated by the pressure sensor. Confirmation may be sent to the operator via a signal to the operator control unit (803).

Upon confirmation of housing unjamming (803), the operator or an automated feature of the control system can send a command (804) to release the pressure applied by the pressure application device(s). Transmission, receipt, and implementation of the command can be accomplished in a manner similar to transmission, receipt, and implementation of other remote vehicle teleoperation commands. In certain embodiments of the present teachings, the at least one pressure application device only releases pressure if a pressure level measured by a pressure sensor (for example, a pressure sensor at the compressor or at the pressure application device) is more than a predetermined desired level (805). When the pressure sensor indicates that the pressure is less than or equal to the predetermined desired level, confirmation can be sent to the operator via a signal to the operator control unit (806).

Although the exemplary embodiment depicted in FIG. 8 discloses releasing an object by deactivating the housing before deactivating the at least one pressure application device, the present teachings are not so limited. For example, the at least one pressure application device can be deactivated before the housing, or both the at least one pressure application device and the housing may be deactivated simultaneously. Furthermore, in an embodiment including a plurality of pressure application devices, the plurality of pressure application devices may be deactivated sequentially or simultaneously.

The present teachings also contemplate a controller, and utilization thereof, for controlling actuation of the housing and/or the pressure application devices to be used as an end effector of a remote vehicle manipulator arm, for example to manipulate an object. In certain embodiments of the present teachings, the controller can facilitate more accurate control of the pressure application devices, and providing haptic feedback (e.g., proportional haptic feedback including a vibration felt by the operator) when the housing touches the object. The controller can also provide a second haptic feedback indicative of the end effector applying a force sufficient to grasp and lift the object. The second feedback can comprise, for example, physical feedback that can be understood by the operator to indicate that the housing and pressure application device(s) have sufficiently grasped an object. The second feedback can include, for example, an audible indicator or a haptic feedback such as a different vibration sensation, or constriction of the controllers hand, wrist, or finger in a manner that suggests the grasping of the object.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims. For example, although the exemplary embodiments described above depict a round housing, the present teachings are not so limited. The housing, for example, may have different shapes, or may comprise multiple housings, without departing from the spirit of the present teachings.

What is claimed is:

1. A gripping device configured to grasp an object, the gripping device comprising:
   a housing comprising:
      a substantially round and flexible container; and
      a point of attachment on an outer portion of the housing being in a plane that is substantially perpendicular to a line extending from the point of attachment toward a center of the housing;
   a jamming material inside the housing;
   a first actuator to actuate the jamming material;
   a pressure activation device disposed on the outer portion of the housing and configured to exert a constricting force on the outer portion of the housing, the pressure activation device comprising at least one of a Mckibben actuator, a jamming belt, an inflatable biased belt, or a jamming belt and an inflatable toroidal housing; and
   a second actuator to actuate the pressure activation device;
   wherein, after the gripping device is pressed against the object, the second actuator actuates the pressure activation device to exert the constricting force on the outer portion of the housing and the first actuator actuates the jamming material to grasp the object.

2. A gripping device configured to grasp an object, the gripping device comprising:
a housing comprising:
a substantially round and flexible container; and
a point of attachment on a first outer portion of the housing being in a first plane that is substantially perpendicular to a line extending from the point of attachment toward a center of the housing;
a jamming material inside the housing;
a first actuator to actuate the jamming material;
a first pressure activation device disposed on the first outer portion of the housing and configured to exert a constricting force on the first outer portion of the housing;
a second actuator to actuate the first pressure activation device;
a second pressure activation device disposed on a second outer portion of the housing and configured to exert a constricting force on the second outer portion of the housing; and
a third actuator to actuate the second pressure activation device;
wherein, after the gripping device is pressed against the object, the second actuator actuates the first pressure activation device to exert the constricting force on the first outer portion of the housing and the first actuator actuates the jamming material to grasp the object, and the second outer portion of the housing is in a second plane that is substantially perpendicular to a line extending from the point of attachment toward the center of the housing.

3. The gripping device of claim 2, wherein a distance between the second pressure activation device and the point of attachment is larger than a distance between the first pressure activation device and the point of attachment.

4. An end effector configured to grasp an object, the end effector comprising:
a housing comprising:
a substantially round and flexible container; and
a point of attachment on an outer portion of the housing being in a plane that is substantially perpendicular to a line extending from the point of attachment toward the center of the housing;
a jamming material inside the housing;
a first actuator to actuate the jamming material;
a pressure activation device disposed on the outer portion of the housing and configured to exert a constricting force on the first outer portion of the housing, the pressure activation device comprising at least one of a Mckibben actuator, a jamming belt, an inflatable biased belt, or a jamming belt and an inflatable toroidal housing; and
a second actuator to actuate the pressure activation device;
wherein, after the end effector is pressed against the object, the second actuator actuates the first pressure activation device to exert an inward force on the outer portion of the housing and the first actuator actuates the jamming material to grasp the object.

5. An end effector configured to grasp an object, the end effector comprising:
a housing comprising:
a substantially round and flexible container; and
a point of attachment on a first outer portion of the housing being in a first plane that is substantially perpendicular to a line extending from the point of attachment toward a center of the housing;
a jamming material inside the housing;
a first actuator to actuate the jamming material;
a first pressure activation device disposed on the first outer portion of the housing and configured to exert a constricting force on the first outer portion of the housing; and
a second actuator to actuate the first pressure activation device,
a second pressure activation device disposed on a second outer portion of the housing and configured to exert a constricting force on the second outer portion of the housing; and
a third actuator to actuate the second pressure activation device;
wherein, after the end effector is pressed against the object, the second actuator actuates the first pressure activation device to exert the constricting force on the first outer portion of the housing and the first actuator actuates the jamming material to grasp the object, and the second outer portion of the housing is disposed is in a second plane that is substantially perpendicular to a line extending from the point of attachment toward the center of the housing.

6. The end effector of claim 5, wherein a distance between the second pressure activation device and the point of attachment is larger than a distance between the first pressure activation device and the point of attachment.

7. A method of using a gripping device to grasp an object, the method comprising:
directing the gripping device toward the object, the gripping device comprising:
a housing comprising:
a substantially round and flexible container; and
a point of attachment on an outer portion of the housing being in a plane that is substantially perpendicular to a line extending from the point of attachment toward a center of the housing;
a jamming material inside the housing;
a first actuator to actuate the jamming material;
at least one pressure activation device disposed on the outer portion of the housing and configured to exert a constricting force on the outer portion of the housing, the at least one pressure activation device comprising at least one of a Mckibben actuator, a jamming belt, an inflatable biased belt, or a jamming belt and an inflatable toroidal housing; and
a second actuator to actuate the pressure activation device;
pressing the gripping device onto the object; and
activating the jamming material in the housing by:
activating the at least one pressure activation device to exert the constricting force on the outer portion of the housing using the second actuator; and
actuating the jamming material using the first actuator.

8. The method of claim 7, wherein activating the at least one pressure activation device comprises sequentially activating the first pressure activation device and the second pressure activation device.

* * * * *

UNITED STATES PATENT AND TRADEMARK OFFICE
CERTIFICATE OF CORRECTION

PATENT NO.        : 8,548,626 B2  
APPLICATION NO.   : 13/204299  
DATED             : October 1, 2013  
INVENTOR(S)       : Erik E. Steltz Page 1 of 1

It is certified that error appears in the above-identified patent and that said Letters Patent is hereby corrected as shown below:

In the Claims:

Column 11, claim number 4, line number 59, which reads "device to exert an inward force" should read "device to exert a constricting force".

Signed and Sealed this  
Seventeenth Day of December, 2013

Margaret A. Focarino  
*Commissioner for Patents of the United States Patent and Trademark Office*